(12) United States Patent
Tin

(10) Patent No.: US 8,144,366 B2
(45) Date of Patent: Mar. 27, 2012

(54) POPULATING MULTIDIMENSIONAL LOOK-UP TABLES WITH MISSING VALUES

(75) Inventor: Siu-Kei Tin, Milpitas, CA (US)

(73) Assignee: Canon Kabushiki Kaisha, Tokyo (JP)

(*) Notice: Subject to any disclaimer, the term of this patent is extended or adjusted under 35 U.S.C. 154(b) by 862 days.

(21) Appl. No.: 12/211,781

(22) Filed: Sep. 16, 2008

(65) Prior Publication Data
US 2010/0067060 A1    Mar. 18, 2010

(51) Int. Cl.
  *H04N 1/40*  (2006.01)
  *G06K 15/00* (2006.01)
(52) U.S. Cl. ....... 358/3.23; 358/525; 382/162; 382/165; 382/167
(58) Field of Classification Search .................. 358/3.23, 358/525; 382/162, 165, 167
See application file for complete search history.

(56) References Cited

U.S. PATENT DOCUMENTS

| | | | | |
|---|---|---|---|---|
| 5,526,020 | A * | 6/1996 | Campanelli et al. | .......... 382/165 |
| 6,571,010 | B1 | 5/2003 | Inoue | |
| 6,705,703 | B2 | 3/2004 | Zeng et al. | |
| 7,176,935 | B2 | 2/2007 | Higgins | |
| 7,190,827 | B2 | 3/2007 | Zeng et al. | |

OTHER PUBLICATIONS

Miheer Bhachech, et al., Improved Color Table Inversion Near The Gamut Boundary, Society for Imaging Science and Technology, 14th Color Imaging Conference Final Program and Proceedings, 2006, pp. 44-49.
Yongda Chen, et al., Six Color Printer Characterization Using an Optimized Cellular Yule-Nielsen Spectral Neugebauer Model, Journal of Imaging Science and Technology, 2004, vol. 48, No. 6, pp. 519-528.
Behnam Bastani, et al., Sparse Cellular Neugebauer Model for N-ink Printers, Society for Imaging Science and Technology, 14th Color Imaging Conference Final Program and Proceedings, 2006, pp. 220-223.

* cited by examiner

*Primary Examiner* — Charlotte M Baker
(74) *Attorney, Agent, or Firm* — Fitzpatrick, Cella, Harper & Scinto

(57) ABSTRACT

Values at nodes of a LUT which is arranged as a rectangular grid of cells are populated, wherein the populated values model an underlying process that transforms from a first color space to a second color space, and some of the cells of the LUT are completely inside a constraint boundary of the underlying process and some of the cells are not completely inside the constraint boundary. The cells are indexed in a certain order. Samples of the underlying process are accessed. Values of nodes for cells whose nodes are all within the constraint boundary are populated first by using the samples of the underlying process. Values of nodes for cells whose nodes are not all within the constraint boundary are populated second by visiting such cells in the indexed order and populating values for the unpopulated nodes using populated ones of the nodes of such cells and the accessed samples.

14 Claims, 15 Drawing Sheets

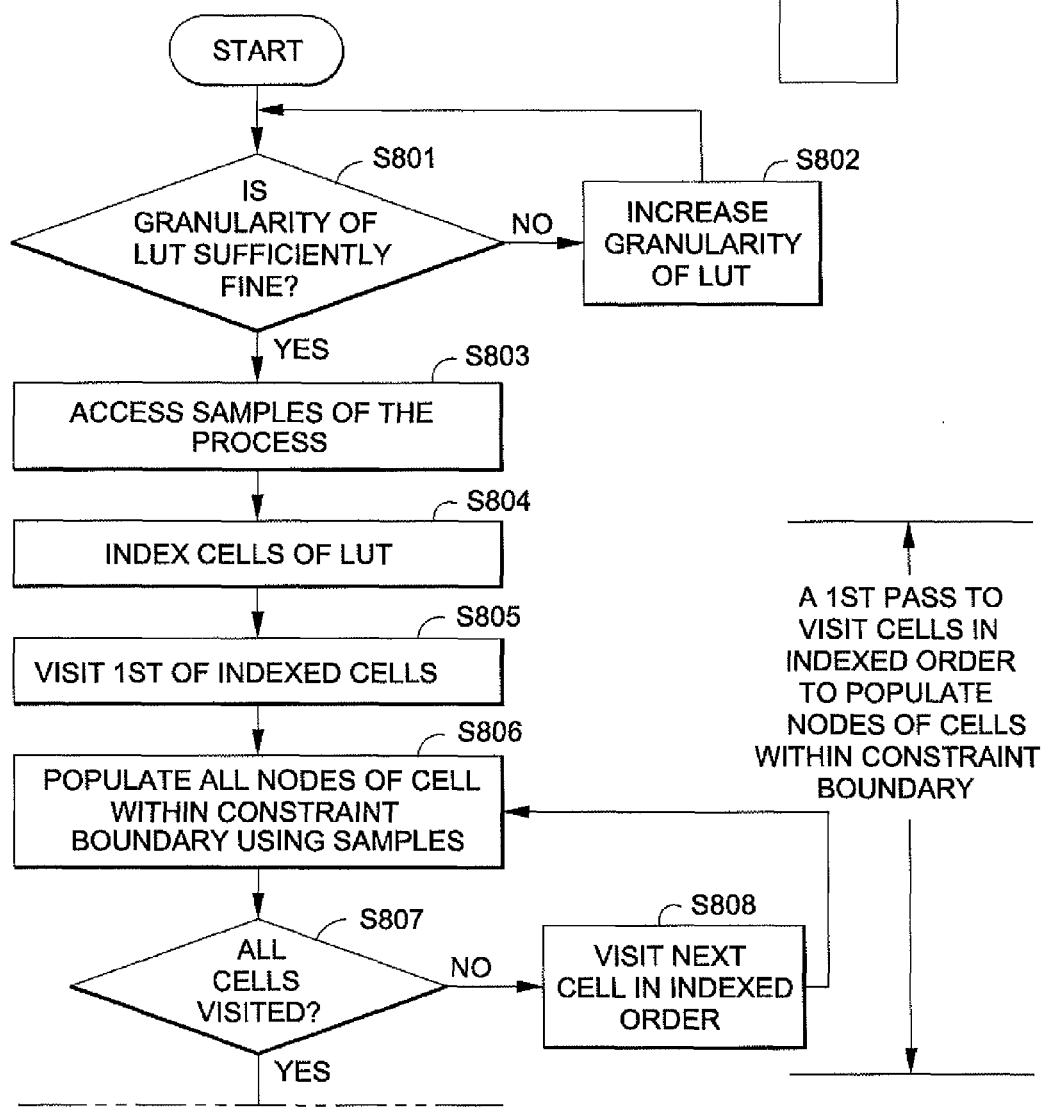

POPULATING MULTIDIMENSIONAL LOOK-UP TABLES WITH MISSING VALUES

BACKGROUND

1. Field

The present disclosure relates to look-up-table (LUT) technology as used in color characterization and color imaging. More specifically, the present disclosure relates to populating values for unpopulated nodes of cells within a LUT, wherein the populated values model an underlying process that transforms from a first color space to a second color space.

2. Description of the Related Art

LUTs are widely used in the fields of color characterization and color imaging. For example, modeling of a device, such as a printer, to allow transformation between device values and device independent colors (such as XYZ or spectral reflectance), generally involves a computationally intensive transform that is usually non-linear and that often must be inverted. In this example, a LUT approach is often used to perform such a transformation. In a second example, a transformation may be used in a composited end-to-end transform. In particular, the end-to-end transform involves a transform from a source device to a device independent color space, a gamut map from the gamut of source device to the gamut of a destination device in the device independent color space, and a transform from the device independent color space to the destination device. In order to perform such multiple transformations, a LUT approach is commonly used to model a composite of the end-to-end transform, to save computational time during use.

The LUT approach involves a two-step process: population of the LUT with suitable values that model the underlying process, and subsequent use of the LUT such as by interpolation so as to transform from a first color space to a second color space. In the populating step, the LUT approach involves sampling the underlying process, where sampling may involve either direct measurement such as calorimetric or spectral measurements of color patches printed by a printer being color characterized, or executing the composited end-to-end transform with selected inputs, such as running a program on a computer.

However, in practice, not every node of the LUT may be measurable, due to existence of a constraint boundary on the underlying process. Sources of the constraint boundary are as varied as the nature of the underlying process being modeled. For example, in modeling a multi-ink printer, a rectangular domain that is the unit cube in a multi-dimensional space represents all possible ink combinations. However, not all ink combinations are printable because the paper generally cannot support ink density beyond a certain limit.

Similarly, when modeling an end-to-end transform, color gamut such as the set of targeted colors or spectrum locus of the human visual system often poses a constraint boundary on the domain of definition of the transform. When a node in the LUT corresponds to a point at which the underlying process is either undefined, or otherwise unmeasurable, it is not possible to populate the node with a value simply by sampling. In other words, the unmeasurable node would be missing in the LUT since it is outside the constraint boundary.

A missing node in the LUT creates problems because most interpolation algorithms require that all nodes be populated. One common solution to this problem is to populate the nodes of the LUT that can be sampled, and populate the nodes that cannot be sampled with a pre-determined value or flag identifying that the value is invalid. Then, when using the LUT in a transformation, a run-time check is performed to determine which nodes are populated with valid values. After performing the run-time check, use of the LUT is restricted to only those cells whose corner nodes are populated with valid values.

Such checking increases computational time to use the LUT. Moreover, it can introduce inaccuracies. As one example of inaccuracies, many points which fall inside the constraint boundary but within a cell with a corner node outside the constraint boundary would not be modeled by the LUT. Depending on the granularity of the LUT sampling, the missing regions within the LUT model may include important colors, and omitting them may diminish the quality of a color transformation.

SUMMARY

The foregoing problems are addressed by providing a method for populating values at nodes of a LUT which is arranged as a rectangular grid of cells, wherein the populated values model an underlying process that transforms from a first color space to a second color space, and wherein some of the cells of the LUT are completely inside a constraint boundary of the underlying process and some of the cells are not completely inside the constraint boundary.

According to one aspect, the cells are indexed in an order which starts with a cell which is inside the constraint boundary and which is also farthest away from the constraint boundary, increases as the cells draw closer to the constraint boundary, and further increases as the cells cross and then fall outside the constraint boundary. Samples of the underlying process which lie on nodes of the grid within the constraint boundary, as well as auxiliary samples which lie between nodes of the grid are then accessed. Values of nodes for cells whose nodes are all within the constraint boundary are populated first by using the samples of the underlying process. Values of nodes for cells whose nodes are not all within the constraint boundary are populated second by visiting such cells in the indexed order and populating values for the unpopulated nodes of such cells using populated ones of the nodes of such cells and the auxiliary samples of the underlying process.

As a result, every node of the LUT is populated with a valid value, even those outside the constraint boundary. Therefore there is ordinarily no need to perform a run-time check for validity when using the LUT in a transformation. Furthermore, the end result LUT is superior to LUTs modeled using existing methods because each node of the end result LUT is populated with a valid value; however, the end result LUT has the same structure as the other modeled LUTs, and therefore the end result LUT is fully compatible with and can be used with existing technologies such as ICC profile format.

According to another aspect, for cells having at least one node within the constraint boundary, the unpopulated nodes are populated by identifying an origin node of the cell. The origin node is inside the constraint boundary and farthest from the constraint boundary. Auxiliary points are then defined on the auxiliary samples of the underlying process for all unpopulated nodes such that each unpopulated node has a corresponding auxiliary sample. The auxiliary points lie inside the constraint boundary between the origin node and the unpopulated nodes. Then, values of all unpopulated nodes are populated by extrapolating using the populated node values and the values of auxiliary samples of the underlying process at the auxiliary points, wherein the extrapolation is an inverse of a pre-designated interpolation algorithm. Because the extrapolated values are based on the pre-designated interpolation algorithm, a more accurate result is obtained when the pre-designated interpolation algorithm is applied against the values at the nodes of the LUT when using the LUT to map from the first color space to the second color space during runtime color conversion.

In yet another aspect, the auxiliary points are defined as an intersection point of a path between the origin node and an unpopulated node and the constraint boundary.

According to another aspect, an origin node for cells having no nodes within the constraint boundary is identified. The origin node for each of such cells is outside the constraint boundary and closest to the constraint boundary. Then, all unpopulated nodes of the cell are populated by visiting such cells in the indexed order and copying a value of the origin node to all the unpopulated nodes of the cell.

In another aspect, a check is made to confirm whether granularity of the LUT is sufficiently fine before the cells are indexed. The granularity of the LUT is sufficiently fine when each cell having a portion within the constraint boundary has at least one node that also lies within the constraint boundary. If the granularity of the LUT is not sufficiently fine, the granularity is increased so that each cell having a portion within the constraint boundary has at least one node that also lies within the constraint boundary.

According to one aspect, a two level LUT structure is used for storing the values for nodes populated in the LUT. Each distinct value of each of the populated nodes is stored in a linear, one-dimensional LUT of distinct values. Moreover, a corresponding index address of the distinct value in the linear, one-dimensional LUT of distinct values is also stored in each node of a multidimensional LUT of indices. For nodes populated with repeated values corresponding with a distinct value in the linear, one-dimensional LUT of distinct values, the index address corresponding to the distinct value is stored in the multidimensional LUT of indices for such nodes.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 8a and 8b show a flowchart for providing a detailed explanation of one exemplary embodiment of the present invention.

DETAILED DESCRIPTION

Figure 1:
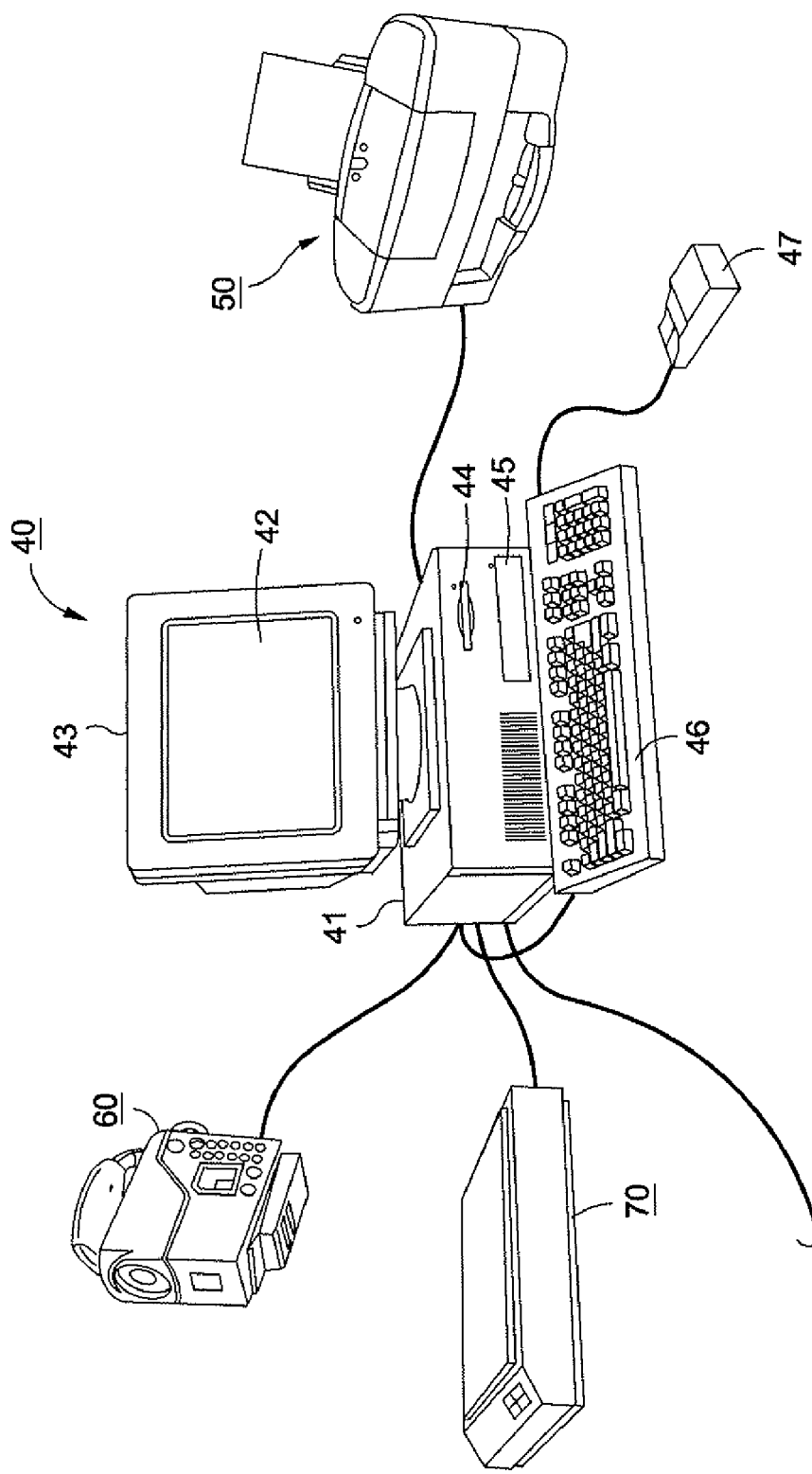
FIG. 1 is a representative view of a computing environment in which the present invention may be implemented.

FIG. 1 shows the external appearance of a representative computing system including a data processing system 40, peripherals and digital devices which may be used in connection with the practice of an exemplary embodiment of the present invention. The data processing system 40 includes host process 41 which comprises a personal computer (hereinafter "PC"), preferably a personal computer which has a windows-based operating system, although the data processing system 40 may be another type of computer which has a non-windows-based operating system. Provided with the data processing system 40 are a color monitor 43 including a display screen 42, a keyboard 46 for entering text data and user commands, and a pointing device 47. The pointing device 47 preferably comprises a mouse for pointing and for manipulating objects displayed on the display screen 42.

The data processing system 40 includes a computer-readable memory medium such as computer fixed disk 45 and/or floppy disk drive 44. Floppy disk drive 44 enables the data processing system 40 to access information, such as computer-executable process steps, computer-executable application programs, etc. stored on removable media. A similar CD-ROM interface (not shown) may be provided for the data processing system 40 through which the data processing system 40 can access information stored on removable CD-ROM media.

Printer 50 is a printer, such as a color bubble jet printer, which forms color images on a recording medium such as paper or transparencies or the like. In addition, digital color scanner 70 is provided for scanning documents and images into data processing system 40 and digital color camera 60 is provided for sending digital images to data processing system 40. Of course, data processing system 40 may acquire digital image data from other sources such as a digital video camera (not shown), a server on a local area network (not shown), or the Internet via network interface bus 80. A spectrophotometer (not shown) or calorimeter (not shown) may also be connected to bus 80 so as to measure the spectral reflectance or colorimetic values of a color sample, and sending the spectral data to data processing system 40.

Figure 2:
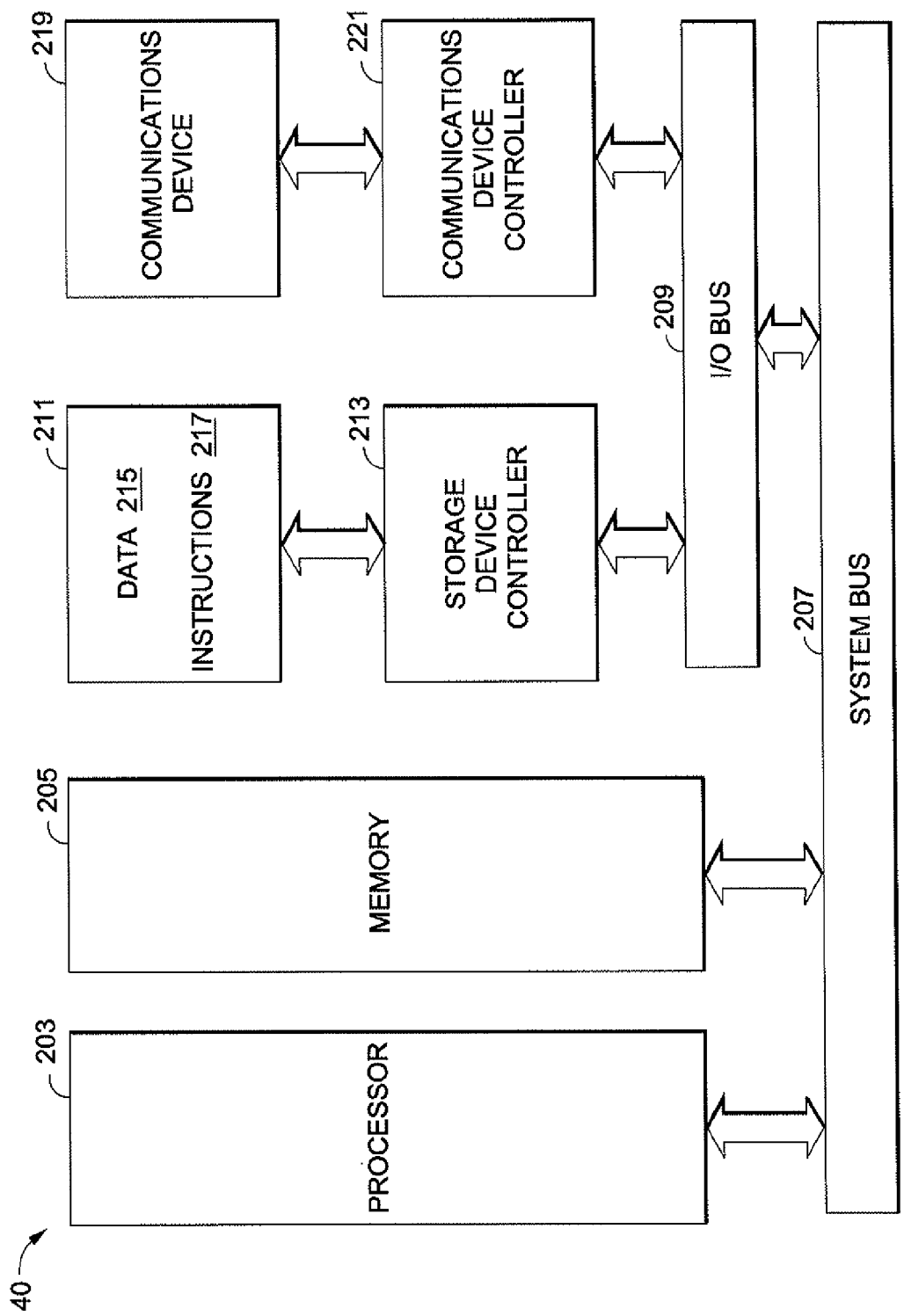
FIG. 2 is a detailed block diagram for explaining the internal architecture of the computer equipment shown in the computing environment of FIG. 1.

FIG. 2 is an architecture diagram of an exemplary data processing system 40. Data processing system 40 includes a processor 203 coupled to a memory 205 via system bus 207. The processor is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to perform any of the methods described below. Thus, processor 203 operates under the control of the instructions 217 to perform the methods of exemplary embodiments of the present invention, as described in more detail below with regards to FIGS. 8 to 10.

In one example embodiment, a color management module (CMM) is stored as one of the sets of program instructions on the storage device 211. The processor 203 loads the CMM program instructions from the storage device 211 into the memory 205 and then executes the loaded CMM program instructions to perform a color transformation between any of the peripheral and/or digital devices shown in FIG. 1, or between other devices not shown.

Figure 3A:
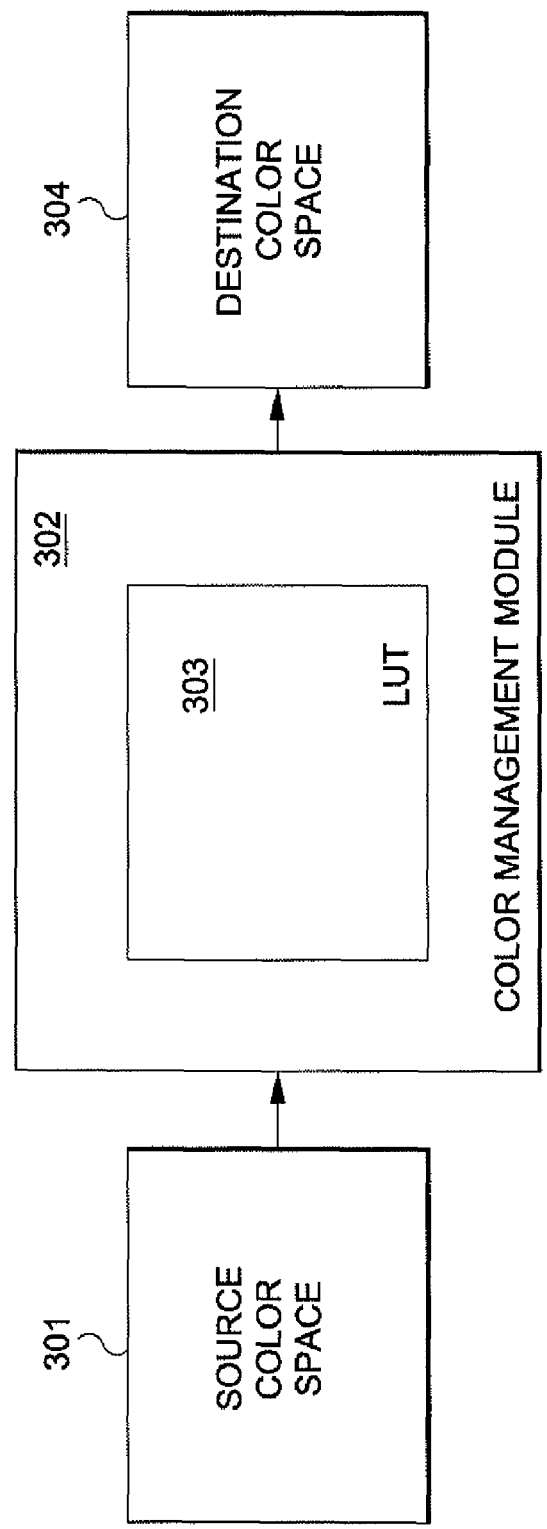
FIG. 3a is a view for providing a general explanation of a color management module for implementing an exemplary embodiment of the present invention.

FIG. 3a is an architectural view of the software for a CMM according to this example embodiment. In this embodiment, CMM 302 is supplied with source color data 301 (e.g., RGB source color data from scanner 70) in a source color space in order to generate destination color data 304 (e.g., CMYK destination color data for printer 50) in a destination color space.

In FIG. 3a, CMM 302 maps color values in the source color space 301 to corresponding color values in the destination color space 304. The mapping is performed by interpolation of values stored in nodes of cells in a color LUT 303 which is created and populated using an exemplary embodiment of the present invention such as the process described in FIGS. 8 to 10. In this embodiment, the CMM 302 creates and populates the LUT 303 using processes described below. However, in other embodiments, LUT 303 is created outside of CMM 302 and then included as part of CMM 302. The LUT 303 is pre-calculated to perform a composited transform from a source color space 301 to a destination color space 304, in which the original transformation was a multi-step end-to-end transform. More specifically, the LUT 303 models an underlying process, the underlying process in this embodiment being the composited end-to-end transform, which includes transforming from a source color space to a device independent color space, gamut mapping from the gamut of the source device to a gamut of the destination device, and transforming from the device independent color space to the destination color space.

In the above-described embodiment, the underlying process was the composited end-to-end transform; however, other embodiments exist in which the underlying process is different. For example, FIG. 3b shows another embodiment in which the underlying process is a transformation from colorant values of a multi-ink printer to a device independent color space (such as XYZ).

Figure 3B:
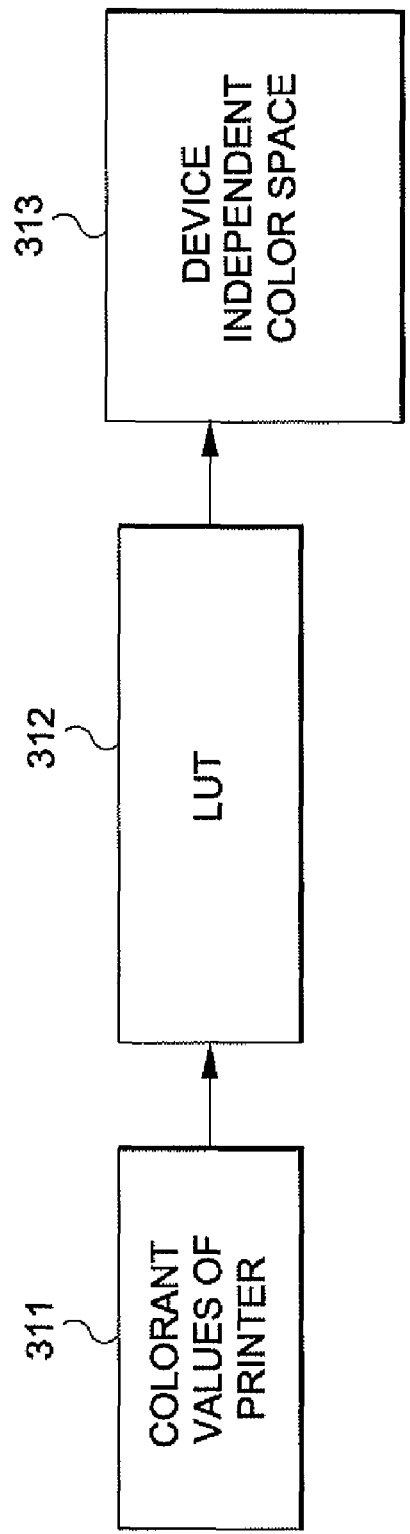
FIG. 3b is a view for providing a general explanation of another exemplary embodiment used for printer characterization.

More specifically, FIG. 3b is an architectural view of the above described transformation which may be inverted and used in a device driver, such as a printer driver according to this example embodiment. In this embodiment, the LUT 312 is inverted and included in a printer driver stored as one of the set of program instructions on the storage device 211 of FIG. 2. Nodes of cells of LUT 312 are populated with values that model the underlying process which transforms from colorant values 311 of a multi-ink printer, such as printer 50, to values in a device-independent color space 313 (such as a CIEXYZ space or spectral reflectance space). The nodes of cells of the LUT 312 are populated with values using an exemplary embodiment of the present invention such as the process described in FIGS. 8 to 10. As shown in FIG. 3b, the LUT 312 maps colorant values 311 of a printer to values in a device-independent color space 313, which in turn are the color values printed by the printer onto a medium.

As described above, LUTs are commonly used in the fields of color characterization and color imaging to transform from a first color space to a second color space. In order to perform such a transformation, the LUTs are populated with values that model an underlying process. The population of LUT values will now be explained.

First, an underlying process $P(x)$ is denoted where x lies in a unit cube in an N-dimensional space; however, $P(x)$ does not have to be defined for every point in the unit cube. By assuming that x lies in the unit cube, it naturally follows that the underlying process is assumed to take place in a bounded rectangular domain, in which case a proper choice of physical units will always reduce the domain to the unit cube. For example, in a case such as the embodiment described with regards to FIG. 3b, where the underlying process $P(x)$ models an N-ink printer, each dimension represents an ink channel in a normalized range [0, 1]. For this example, the underlying process returns values in an M-dimensional space. In particular, if in the example of the N-ink printer, the color characterization is calorimetric, then $P(x)$ returns values in CIEXYZ space, for example, and M would be 3. In the same example, if the color characterization is spectral, then $P(x)$ returns spectral reflectance, and M would be the number of spectral bands, which is typically 31 or higher.

In many situations, $P(x)$ may not be defined for every point x in the unit cube. For example, in the embodiment in FIG. 3a, there may be a gamut in the source color space outside which the color transform is invalid. In the case of embodiment in FIG. 3b, the printer may have a physical limitation on the total ink coverage, so that there are regions in the unit cube that correspond to unprintable ink combinations. Because $P(x)$ is not required to be defined for every point in the unit cube, a Boolean function called the "constraint boundary function" $G(x)$ can be used to describe this situation. More specifically, if $G(x)$ is TRUE, $P(x)$ is defined and measurable at x. If $G(x)$ is FALSE, $P(x)$ is undefined, or otherwise unmeasurable at x.

Figure 4:
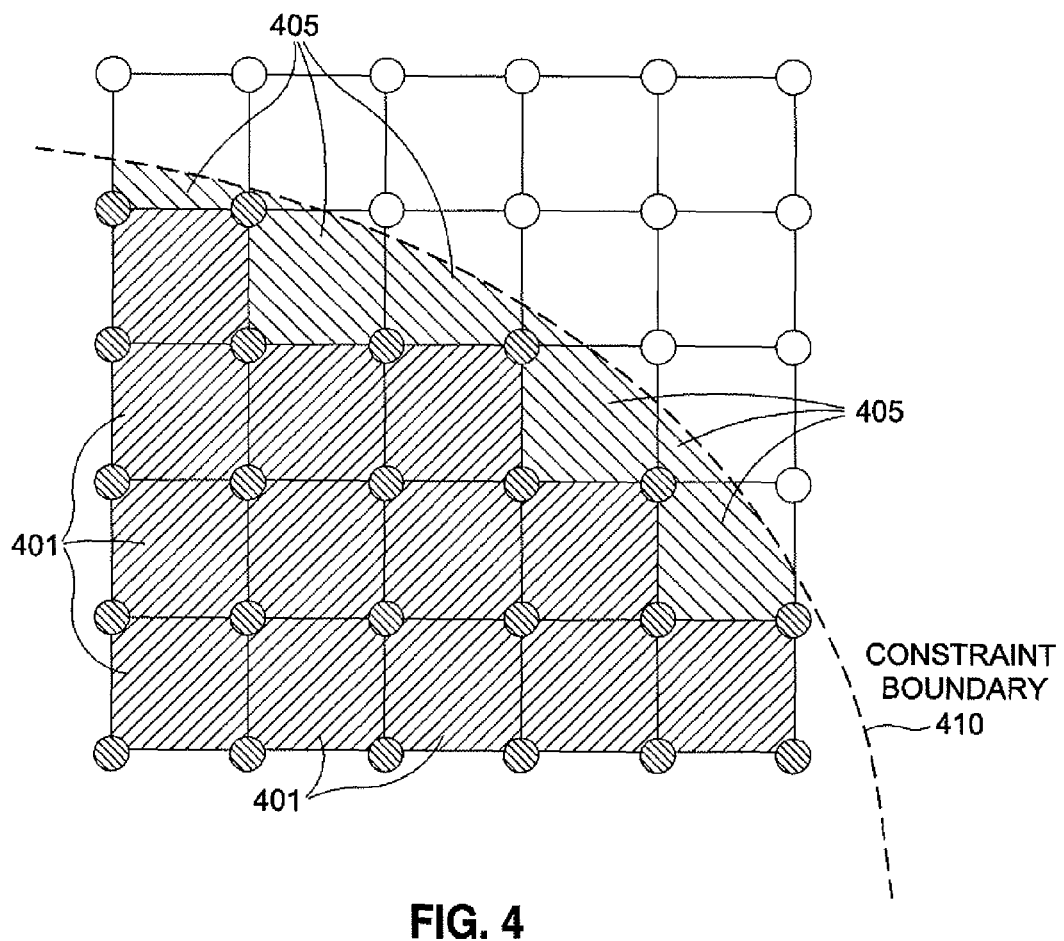
FIG. 4 shows an example two-dimensional LUT for modeling an underlying process.
Figure 9:
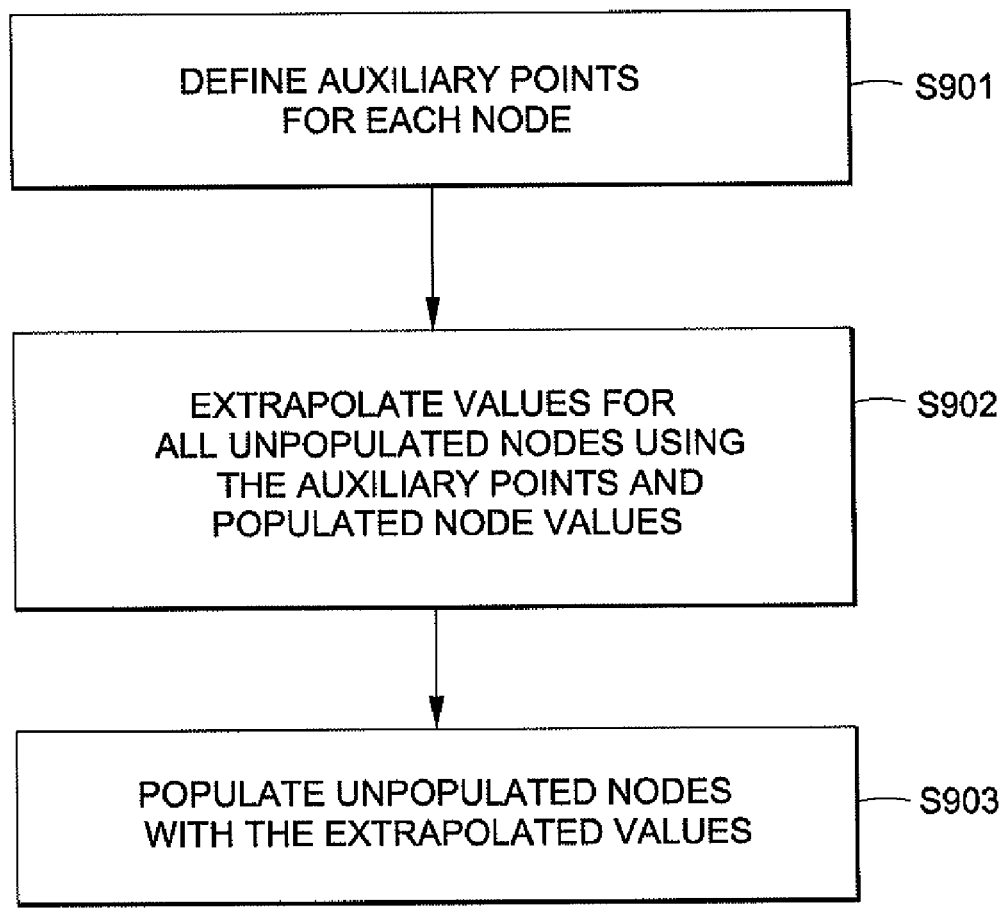
FIG. 9 is a flowchart for providing a detailed explanation of the step of populating unpopulated nodes using NodeFittingRoutine shown in FIGS. 8a and 8b.
Figure 10:
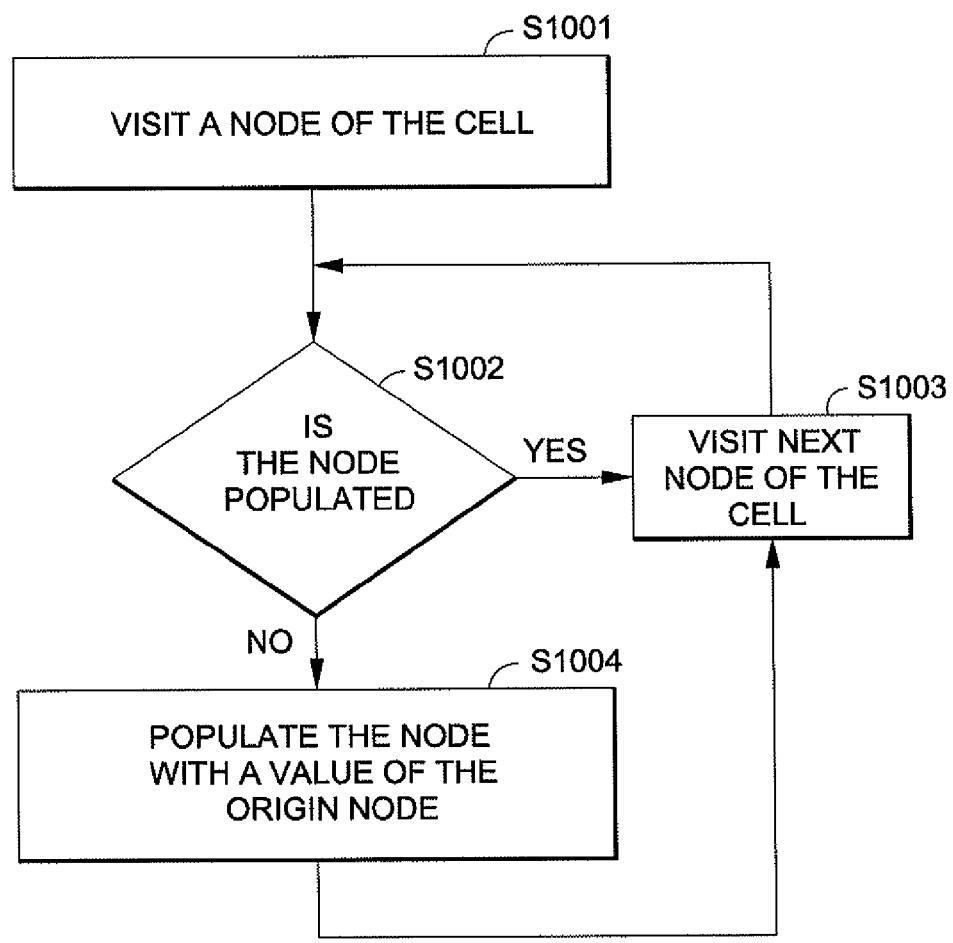
FIG. 10 is a flowchart for providing a detailed explanation of the step of populating unpopulated nodes using NodeCopyingRoutine shown in FIGS. 8a and 8b.

A constraint boundary is illustrated in FIG. 4, in which an example two-dimensional LUT for modeling an underlying process is shown. Two regions of the LUT inside constraint boundary 410 are shown in FIG. 4, namely region 401 and region 405. For cells in region 401, the nodes can be populated by sampling the underlying process $P(x)$; however, for cells in region 405, some of the nodes cannot be populated by sampling the process, because they lie outside the constraint boundary. Therefore, an exemplary embodiment as described in detail below with regards to FIGS. 8 to 10 is provided to populate an LUT with valid values at nodes where the underlying process is undefined or otherwise unmeasurable.

In accordance with the methodology of LUT, a rectangular grid is introduced on the unit cube. The spacing between the steps in each channel does not need to be uniform. In fact, it is common to use non-uniform steps to account for non-linearity in each channel. On the other hand, a one-dimensional transformation (sometimes called a "shaper curve") can be performed in each channel before applying the LUT, so that without loss of generality, the LUT can be assumed to be uniformly spaced.

Before the LUT is populated with suitable values which model the underlying process $P(x)$, it is helpful if two hypotheses are met. If both are met, then it is ordinarily possible to obtain all of the advantageous results provided by the exemplary embodiment described in FIGS. 8 to 10. However, if either of the two hypotheses is not met, the LUT will still be populated with values which model the underlying process P(x). These two hypotheses are the "granularity hypothesis" and the "cell indexing hypothesis", and are explained below.

Granularity Hypothesis

In order for the method described below with regards to FIGS. 8 to 10 to effectively populate the LUT with valid values, a sufficient granularity (i.e., the number of steps used in each channel) of the LUT should be determined. First, the granularity should be sufficiently fine to model the nonlinearity of P(x). In this case, it is assumed that a rectangular grid of appropriate granularity is determined and used. In particular, it is assumed that without loss of generality that the steps in each channel are uniformly spaced. For simplicity, each channel is assumed to use the same number of steps, which will be denoted as K. In general, the number of steps in each channel can be different, but extending the below described method which assumes the same number of steps in each channel to channels with a different number of steps is fairly straightforward. Secondly, the granularity must be sufficiently fine so that a cell in the LUT is either completely outside the constraint boundary; or, if the cell intersects the constraint boundary, then at least one of the cell's nodes is inside the constraint boundary.

Figure 5A:
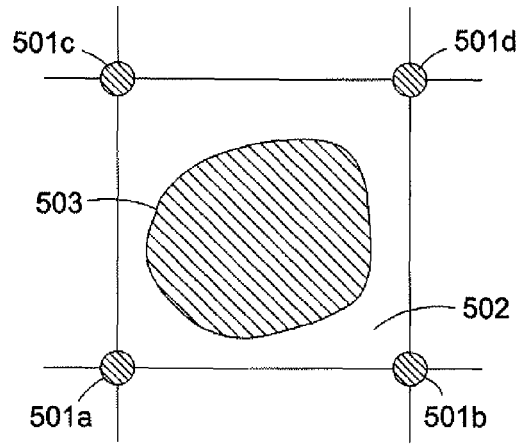
FIGS. 5a to 5c show examples of different LUTs with different levels of LUT granularity.
Figure 5B:
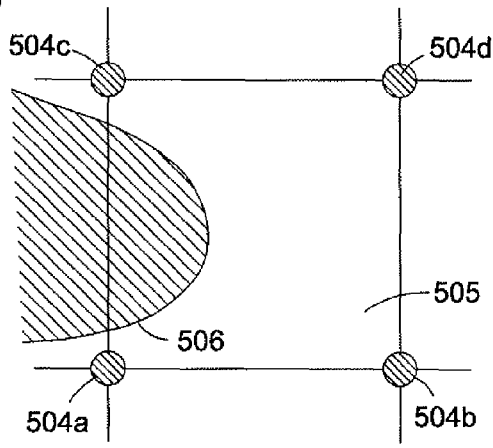
Figure 5C:
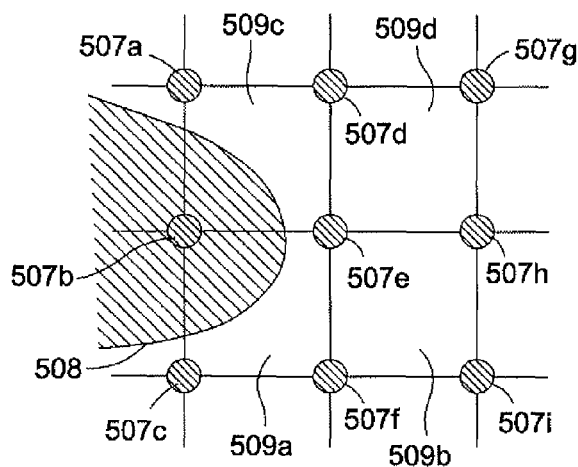

FIGS. 5a to 5c show different levels of granularity, in which FIGS. 5a and 5b are examples in which the granularity of the LUT is not sufficiently fine, and FIG. 5c is an example in which the granularity is sufficiently fine. FIG. 5a is a trivial case which shows a cell 502 of the LUT defined by nodes 501a to 501d, in which the cell 502 contains the whole constraint boundary 503. In this case, the steps clearly need to be subdivided further to better capture the details of the constraint boundary 503. FIG. 5b shows a less obvious case in which a constraint boundary 506 intersects a cell 505, but does not intersect any of nodes 504a to 504d of the cell 505. In this case, the granularity of the LUT would need to be increased by further subdividing the steps as shown in FIG. 5c. In FIG. 5c, the cell 505 is subdivided into cells 509a to 509d which are defined by nodes 507a to 507i so that the LUT has a sufficient granularity. In particular, cells 509a and 509c intersect constraint boundary 508, and have a node 507b, which is inside constraint boundary 508. Also, none of the other cells of FIG. 5c intersect the constraint boundary 508 and thus, the LUT shown in FIG. 5c has sufficient granularity.

On the other hand, there is not a general algorithm for instructing how to subdivide in order to resolve a granularity non-compliance. A proper subdivision to resolve non-compliance depends on the geometry of the constraint boundary, and is therefore problem specific. One method for resolving non-compliance through subdivision is to subdivide (such as in a binary fashion), check for sufficient granularity, and then subdivide further if necessary.

Cell Indexing Hypothesis

In addition to having a LUT with sufficient granularity, the cells of the LUT must be indexed in a specific order for the method described below with regards to FIGS. 8 to 10 to effectively populate the LUT with valid values. The specific ordering of the cells is conveniently abstracted by using a "Cell Indexing Function" I(c) where c is a cell in the LUT:

$$I(c) \in \{1, 2, \ldots, (K-1)^N\}$$

such that if $I(c_1)=I(c_2)$, then $c_1=c_2$. In addition, each cell is also assigned an "Origin Node", which is one of the nodes of the cell. The assignment of an Origin Node will be denoted by $\Omega(c)$. A "Node Ranking Function" R(v) is derived by defining $R(v)=\min_c I(c)$ where c is any cell having v as one of its nodes (which is not necessarily the designated Origin Node of the cell). Also, while I(c) is a one-to-one assignment of cells to an index in the range $[1, 2, \ldots, (K-1)^N]$, R(v) is not a one-to-one assignment. Rather, R(v) assigns an integer to each node, but the assignment is not one-to-one because there are $K^N$ nodes.

The Cell Indexing Hypothesis is a hypothesis on the constraint boundary (as described by G(x)), the Origin Node and the Cell Indexing Function so that they work together correctly. More specifically, the Cell Indexing Hypothesis says: For each cell c of the LUT, if the Origin Node $\Omega(c)$ is outside the constraint boundary, i.e., $G(\Omega(c))$ is FALSE, then the whole cell c is outside of the constraint boundary, and $R(\Omega(c))<I(c)$. In other words, the first part of the hypothesis means that the Origin Node is the most within-the-constraint-boundary node of the cell, so if the Origin Node is outside the constraint boundary, the whole cell has to be outside the constraint boundary. The second part of the hypothesis means that if the cells are visited according to the ordering specified by the Cell Indexing Function, then the Origin Node of each cell would have been seen in a previous cell (though not as the Origin Node of that cell).

Now, two examples will be described with reference to FIGS. 6 and 7 in which both the granularity hypothesis is met and the cell indexing hypothesis is met.

In a first example, using the embodiment described with reference to FIG. 3b, for a printer with N inks, assume that the ith ink has a tone reproduction curve $x=\gamma_i(d)$ that converts printer device value d to ink density value x. Each tone curve is also assumed to be monotonically increasing. In this example, the LUT will model the printer model which transforms from ink densities to a device independent color space, for example XYZ. A total ink limit of L on the printer device values means the following constraint is imposed:

$$\sum_{i=1}^{N} \gamma_i^{-1}(x_i) \leq L$$

for arbitrary ink densities $x_1, \ldots, x_N$. Due to monotonicity of the tone reproduction curves, the granularity hypothesis is trivially satisfied. In particular, if a cell intersects the constraint boundary, which means that some ink combination inside the cell is within the ink limit, then the node with the lowest total ink is necessarily inside the constraint boundary. For example, in FIG. 6, cell 604 intersects the constraint boundary, and the node 611, which has lowest total ink in the cell, also lies inside the constraint boundary.

In addition, for each cell, an Origin Node is defined to be the node with the lowest total ink. In FIG. 6, for each of the cells, for example cells 602, 604 and 606, Origin Nodes 609, 611 and 607 are defined and indicated with an arrow. For the Cell Indexing Function, the indices result from sorting the cells in ascending order of the total ink of their Origin Node as indicated with numbers inside the cells in FIG. 6. When two cells have the same lowest total ink, there may be some arbitrariness in the sorting; however, this will not create any problems because in that situation, any sort would suffice. In this example, the cell indexing hypothesis is fulfilled. In particular, $R(\Omega(c))<I(c)$ holds for any cell c except the one cell containing $(0, \ldots, 0)$, and this one cell also satisfies the cell indexing hypothesis because $\Omega(c)=(0, \ldots, 0)$ is within the constraint boundary. For example, in FIG. 6, cell 606 has an Origin Node 607 which has a lowest total ink of nodes 603, node 605 and node 607, and is also outside the constraint boundary 610. Therefore, the whole cell 606 is necessarily outside of the constraint boundary 610 as shown.

Figure 7:
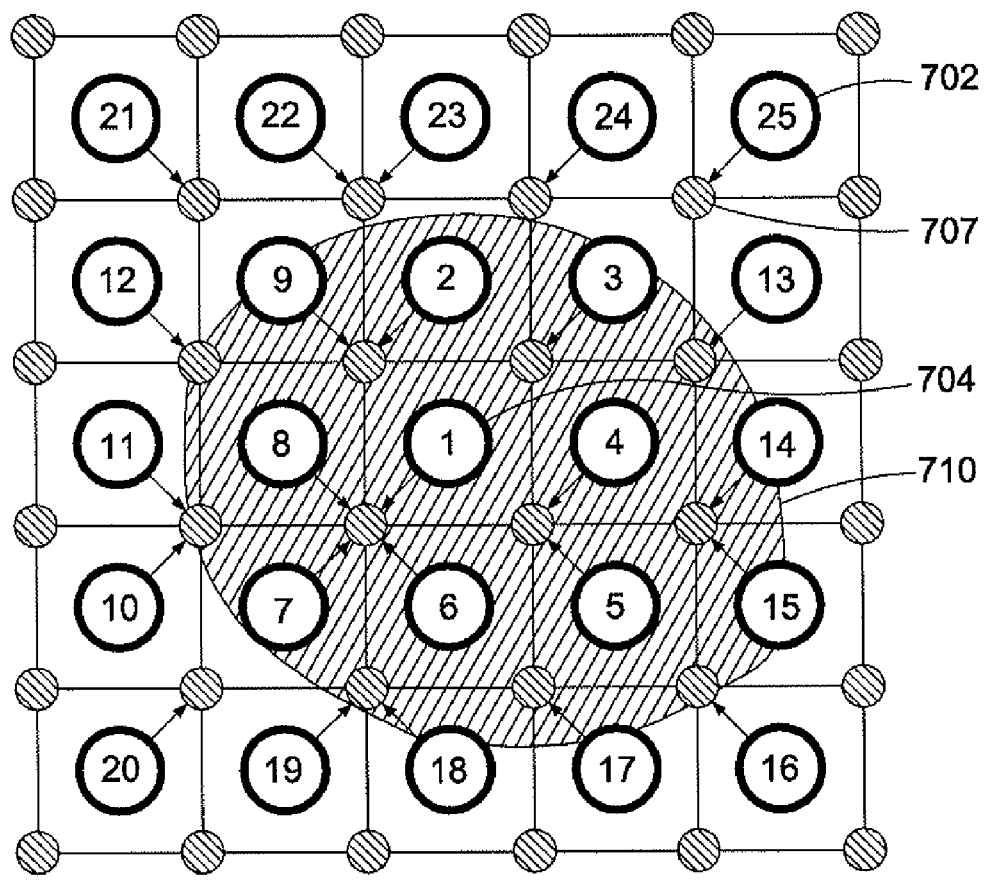
FIG. 7 shows an example two-dimensional LUT with an arbitrary gamut constraint boundary.

In a second example, referencing the embodiment described with regards to FIG. 3a, a two-dimensional arbitrary constraint boundary 710 as shown in FIG. 7 is used to demonstrate how confirming granularity and cell indexing is done with one very concrete two-dimensional example. However, in more complicated applications, there will be some kind of analytical or empirical description of the constraint boundary, the dimension will be higher than two, and an algorithm could be developed for establishing cell indexing and origin assignment that can be determined based on the constraint boundary description data and other insights that will be specific to the problem. In this example, for the Cell Indexing Function, the indices result from ordering the cells in an "outward spiral", starting with the cell which is most inside the constraint boundary, and ending with the cell which is most outside the constraint boundary. As shown in FIG. 7, the ordering starts with cell 704 as indicated with the number 1 (first index), and ends with cell 702 as indicated with a number 25 (last index). The granularity hypothesis can be verified by checking each of the 25 cells. The definition of the Origin Node for each cell is indicated by the arrows. The cell indexing hypothesis can be verified for each cell as well. For example, cell 702 indexed as 25 has an origin node 707 that is outside of the constraint boundary 710. The whole cell 702 is also outside the constraint boundary 710, verifying the first part of the cell indexing hypothesis. Next, node 707 is shared by four cells, one of which has an index of 3 which is the lowest among the four cells. It follows that the ranking of this node is 3, which is less than 25, verifying the second part of the cell indexing hypothesis. The cell indexing hypothesis for other cells is similarly verified.

An exemplary embodiment for populating values at nodes of a LUT will now be described with regards to FIGS. 8 to 10.

Figure 8B:
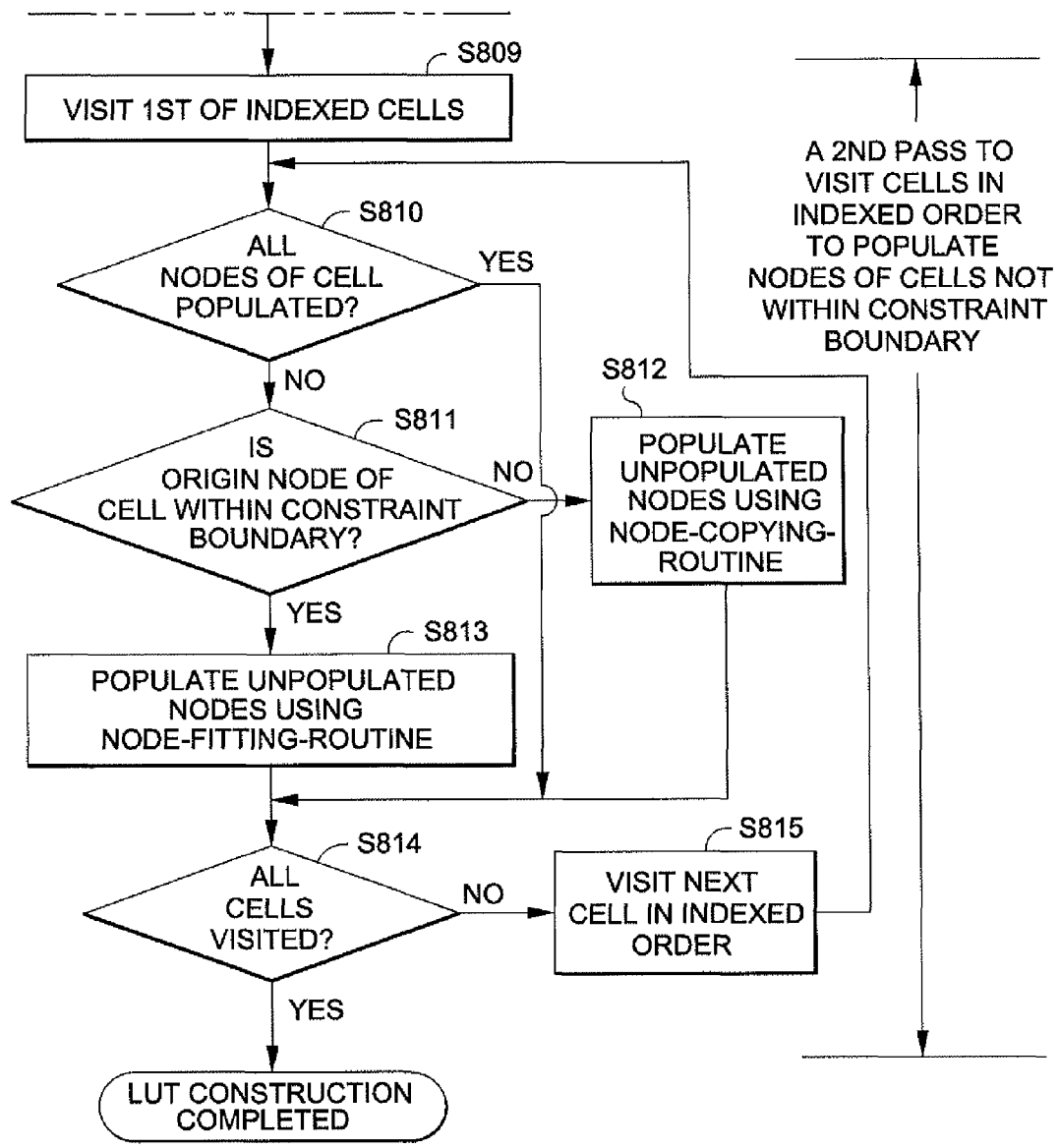

FIGS. 8a and 8b show a flowchart of a process in accordance with an exemplary embodiment used to populate every node of a LUT with a valid value. In step S801, a check is made as to whether granularity of the LUT is sufficiently fine. The granularity of the LUT is sufficiently fine when each cell having a portion within the constraint boundary has at least one node that also lies within the constraint boundary as discussed in detail above with regards to FIGS. 5 to 7. If the granularity of the LUT is not sufficiently fine, the granularity is increased (step S802) so that each cell having a portion within the constraint boundary has at least one node that also lies within the constraint boundary.

In step S803, samples of the underlying process which lie on nodes of the grid within the constraint boundary, as well as auxiliary samples which lie between nodes of the grid are accessed. The method used for accessing the samples of the underlying process depends on the underlying process. For example, in the case of printer device modeling, the samples of the underlying process are accessed by reading data (device value—measurement pairs) from a profile. In this case, the samples on the grid or the auxiliary samples have already been determined from a prior printer characterization, which could have happened in a different space and time. In another example, when modeling an end-to-end transform, the sample is usually accessed when constructing the LUT by sampling the underlying transform.

Figure 6:
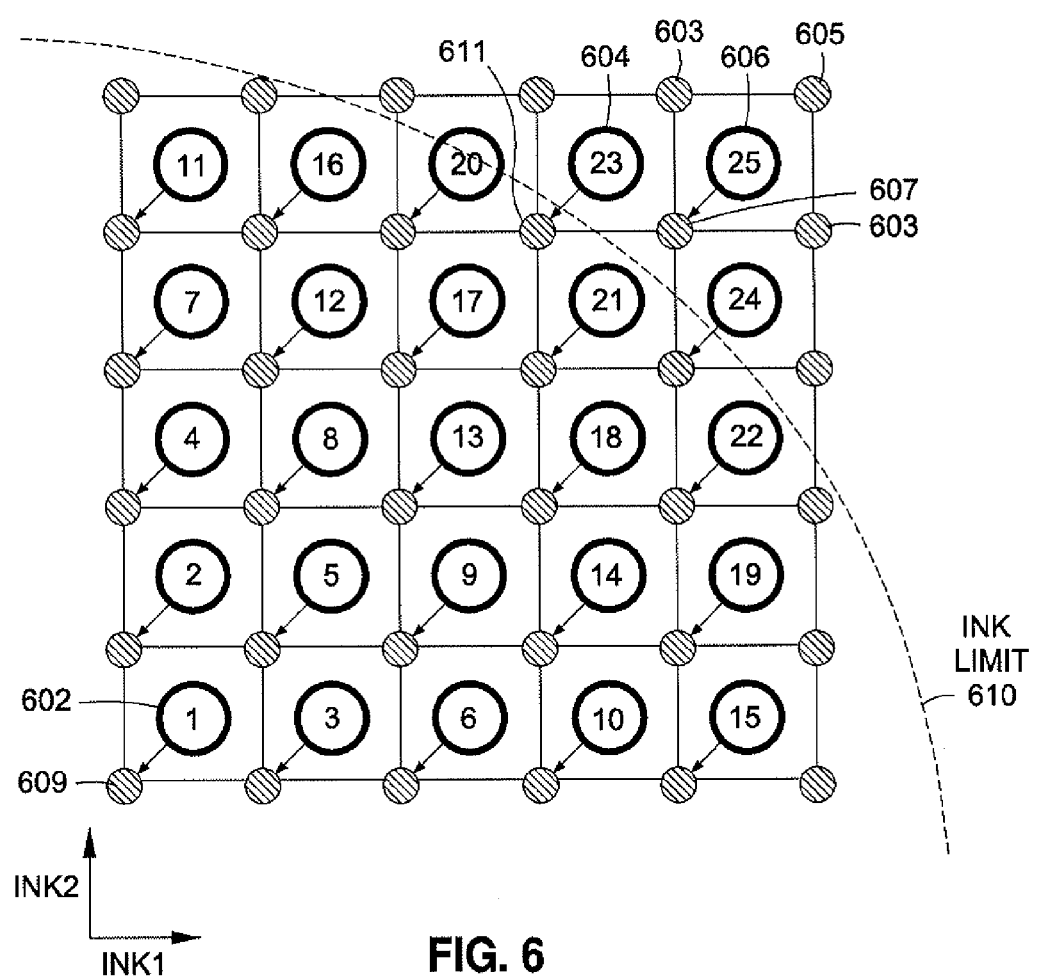
FIG. 6 shows an example two-dimensional LUT with an ink limit constraint boundary.

In step S804, the cells of the LUT are indexed in an order as described in detail with regards to FIGS. 6 and 7. In general, the order in which the cells are indexed starts with a cell which is inside the constraint boundary and which is also farthest away from the constraint boundary, increases as the cells draw closer to the constraint boundary, and further increases as the cells cross and then fall outside the constraint boundary.

The cells are then visited in the indexed order, starting with the 1st cell of the indexed order (step S805). All unpopulated nodes of the cell that are within the constraint boundary are populated with values using the samples of the underlying process (step S806).

In step S807, a determination is made as to whether all of the cells of the LUT have been visited. If the answer is no, then the next cell in the indexed order is visited (step S808), and all unpopulated nodes of the cell that are within the constraint boundary are populated with values using the samples of the underlying process (step S806).

In general, steps S805 through S808 represent the making of a 1st pass to visit the cells of the LUT in an indexed order to populate nodes of cells within the constraint boundary.

If all of the cells have been visited, then the 1st cell of the indexed order is again visited (step S809). In step S810, a determination is made as to whether all the nodes of the cell have been populated. If all the nodes of the cell have been populated, then a determination is made as to whether all of the cells have been visited (for a second time) (step S814). If all of the cells have not been visited, the next cell in the indexed order is visited (step S815), and the underlying process returns to step S810. If all the cells have been visited (for a second time), then construction and population of the LUT are complete.

If all the nodes of the cell have not been populated in step S810, then a determination is made whether an Origin Node of the cell is within the constraint boundary (step S811). If the Origin Node of the cell is within the constraint boundary, then all unpopulated nodes of the cell are populated using a Node-FittingRoutine (step S813) described in detail with regards to FIG. 9. If the Origin Node of the cell is not within the constraint boundary, then the unpopulated nodes of such cell are populated using a NodeCopyingRoutine (step S812) described in detail with regards to FIG. 10. Then, the process continues to step S814.

In general, steps S809 through S815 represent the making of a 2nd pass to visit the cells of the LUT in an indexed order to populate nodes of cells that are not within (i.e., outside) the constraint boundary.

Table 1 shows example pseudocode for executing steps S805 to S815 of FIGS. 8a and 8b.

TABLE 1

Example Pseudocode

/* Main loop */
For Cell Index i = 1 TO (K − 1)$^N$
{
   c = the cell that corresponds to i
   /* First pass: Populate all nodes that are within constraint boundary
   FOREACH node v belonging to the cell c
   {
      IF v is within constraint boundary and hasn't been populated yet
THEN
      {
         Populate v by sampling the underlying process P(x)
      }
   }
   /* Second pass: Populate the remaining (outside-of-constraint
boundary)*/
   /*nodes, if any */
   IF all nodes are already populated THEN
   {
      Goto next cell
   }
   ELSE
   {
      IF Origin Node Ω(c) is inside constraint boundary THEN
      {

TABLE 1-continued

Example Pseudocode

```
            /* Ω(c) is already populated because it is inside constraint */
            /* boundary */
            NodeFittingRoutine (c)
        }
        ELSE
        {
            /* Ω(c) is already populated because of the Cell Indexing */
            /* Hypothesis. This is because Ω(c) belongs to a cell that */
            /*has a smaller index, so must have been populated
            earlier.*/
            NodeCopyingRoutine (c)
        }
    }
}
```

As shown in Table 1, the process will populate every node of the LUT with a valid value, whether the node is inside the constraint boundary or outside the constraint boundary. The process does so by going through each cell and populating the nodes that belong to that cell, rather than going through each node individually. In other words, the process recognizes the fact that populating the nodes should be considered a "neighbor operation", not a "point operation".

FIG. 9 shows a flowchart which provides a more in depth explanation of the step of populating unpopulated nodes using NodeFittingRoutine as described in FIGS. 8a and 8b.

For a cell c, the NodeFittingRoutine populates nodes of the cell that have not been populated yet using a fitting procedure. This procedure takes advantage of having knowledge of the interpolation algorithm to be used in LUT interpolation.

Generally, an interpolation algorithm T is assumed to take as inputs (a) the values at the $2^N$ corner nodes of the cell and (b) an N-vector a that is the "local coordinates" (between 0 and 1) within the cell, and calculates the interpolated value by linearly combining the values at the $2^N$ corner nodes with weights $w_i(a)$. The weights are what distinguish one interpolation algorithm from another. More precisely, if the values at the $2^N$ corner nodes are $p_i$, then the interpolated value is given by $$T(a; \{p_i\}) = \sum_{i=1}^{2^N} w_j(a)p_i.$$

Many common interpolation algorithms take this form, such as, for example tetrahedral interpolation and multilinear interpolation. These algorithms have the important property that although they could be highly nonlinear in the local coordinates a (via the weight functions), the algorithms are linear in the values at the nodes.

However, not all interpolation models share this property. For example, in one dimension, the following model could be used to interpolate between a=0 and a=1:

$$S(a) = p_0^{1-a} p_1^a.$$

This model "interpolates" between 0 and 1 because at a=0 it gives the value $p_0$, the given value at a=0 and at a=1, it gives the value $p_1$, the given value at a=1. However, this model is not linear in $p_0$ or $p_1$. However, sometimes a transformation of coordinates can bring the model to compliance. In the same example model above, if a logarithmic transformation is first performed on the data, then the model satisfies the assumption:

$$T(a) = (1-a)\log(p_0) + a\log(p_1).$$

After the interpolation, the model is exponentiated to get back to the original coordinate, i.e., S(a)=exp(T(a)). In Color Science, this example underpins the transformation from reflectance to density by taking the logarithm.

Figure 11:
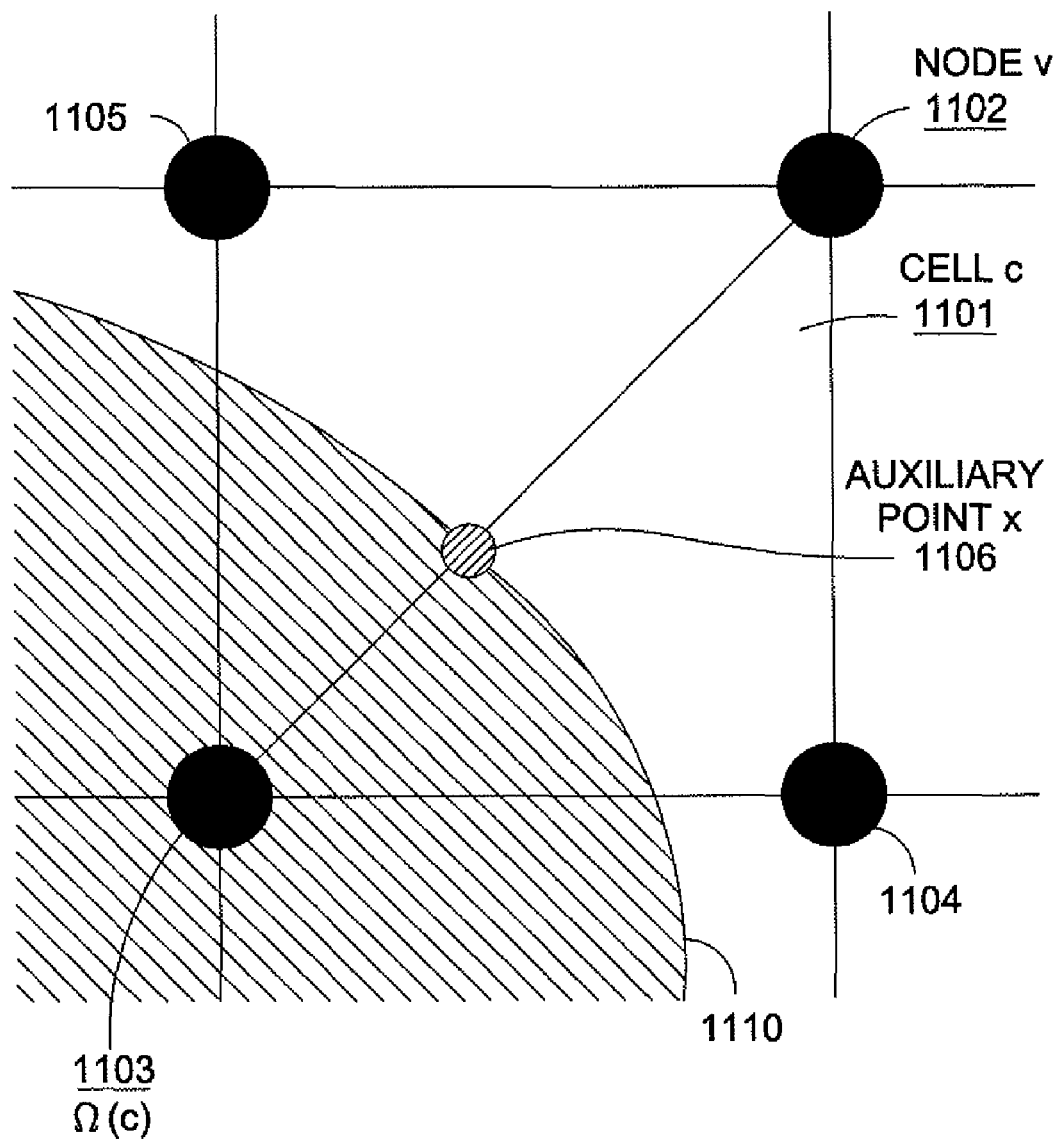
FIG. 11 is an illustration of the extrapolating step shown in FIG. 9.

When using an interpolation algorithm, generally all $2^N$ nodes of the cell should be populated, and thus a node with missing values should be populated appropriately first. The NodeFittingRoutine does this by using a fitting procedure that makes use of knowledge of the interpolation algorithm. More specifically, with reference to FIG. 9 and FIG. 11, for each node v in the cell (e.g., node v 1102 in FIG. 11), an auxiliary point x (step S901) is defined as follows. If v is already populated, then x=v. The definition of the auxiliary point in this case is trivial and is done to provide notational uniformity with the case where v is not already populated. If v has not been populated yet, then it must be outside of constraint boundary 1110. On the other hand, Origin Node Ω(c) 1103 is within constraint boundary 1110, so constraint boundary 1110 must intersect a path joining Origin Node Ω(c) 1103 and node v 1102 somewhere between the two. Then, x (auxiliary point x 1106) is defined to be the intersection point on constraint boundary 1110, closest to Origin Node Ω(c) 1103. Next, order the $2^N$ nodes in some fashion (e.g., lexicographical order), call them $v_1, v_2, \ldots, v_{2^N}$, and order the auxiliary points similarly as $x_1, x_2, \ldots, x_{2^N}$. By definition of these auxiliary points, either a value is already associated with them (the case when the corresponding node in the cell is already populated), or the underlying process P(x) is defined on them (the case when the corresponding node in the cell is not already populated). Then, values are extrapolated for all unpopulated nodes (step S902) by forming a system of linear equations and solving for the unknowns $p_1, p_2, \ldots, p_{2^N}$:

$$\begin{pmatrix} w_1(a(x_1)) & w_2(a(x_1)) & \ldots & w_{2^N}(a(x_1)) \\ w_1(a(x_2)) & w_2(a(x_2)) & \ldots & w_{2^N}(a(x_2)) \\ \vdots & \vdots & \ddots & \vdots \\ w_1(a(x_{2^N})) & w_2(a(x_{2^N})) & \ldots & w_{2^N}(a(x_{2^N})) \end{pmatrix} \begin{pmatrix} p_1 \\ p_2 \\ \vdots \\ p_{2^N} \end{pmatrix} = \begin{pmatrix} q_1 \\ q_2 \\ \vdots \\ q_{2^N} \end{pmatrix}$$

where $$q_i = \begin{cases} \text{value at } v_i \text{ if } v_i \text{ has already been populated} \\ P(x_i) \text{ if } v_i \text{ has not been populated yet.} \end{cases}$$

Now, a yet unpopulated node $v_i$ is populated with value $p_i$ (i.e., populate unpopulated nodes with the extrapolated values (step S903)). The values $p_i$ for already populated nodes $v_i$ are not used apparently, but they are just the same values as the already populated values $q_i$. In fact, it is apparent that if a node $v_i$ is already populated, then $x_i=v_i$, $w_j(a(x_i))=\delta_{ij}$ (Kronecker delta), and $p_i=q_i$, the same value that has been used in populating the node $v_i$, so there is consistency.

In the above described embodiment, the auxiliary point construction yields a point that is within the constraint boundary. In other embodiments, a different construction of auxiliary points may be defined that still yields a point within the constraint boundary, so that P(x) is defined at the point.

In some instances, the above-described linear system could be singular. For example, a "bad" interpolation algorithm can cause the coefficient matrix to be singular. In particular, this may happen with a "nearest neighbor interpolation" algorithm where the weights are either 0 or 1 depending on the location of the point. In this case, even though our construction of the auxiliary point x as a point along a path connecting Ω(c) and v is generally robust and yields a well-conditioned coefficient matrix, because the interpolation result does not depend on v, there is not a known way to adjust the value at v to achieve a given value at x. However, the above linear system generally gives a unique solution for a reasonable interpolation algorithm and when the auxiliary point is not too close to the Origin Node.

FIG. 10 shows a flowchart for providing a more in depth explanation of the step of populating unpopulated nodes using NodeCopyingRoutine shown in FIGS. 8a and 8b. In step S1001, each node v belonging to the cell c is visited, and if the node is populated (S1002) then the next node of the cell is visited (step S1003). If the node is unpopulated (step S1002), then populate the node v with a value of the Origin Node Ω(c) (step S1004). When populating nodes using the NodeCopyingRoutine, the nodes are populated with valid values because the Origin Node Ω(c) has already been populated with a valid value as a result of visiting the cells in the indexed order, and the Origin Node Ω(c) will belong to a cell with a smaller index number, consequence of the cell indexing hypothesis.

Table 2 shows example pseudocode for performing the process described in FIG. 10.

TABLE 2

Example Pseudocode for NodeCopyingRoutine

```
/* NodeCopyingRoutine */
FOREACH node v belonging to cell c
{
    IF v is populated THEN
    {
        Continue onto the next node
    }
    ELSE
    {
        Populate v with the value at Ω(c)
    }
}
```

Figure 12:
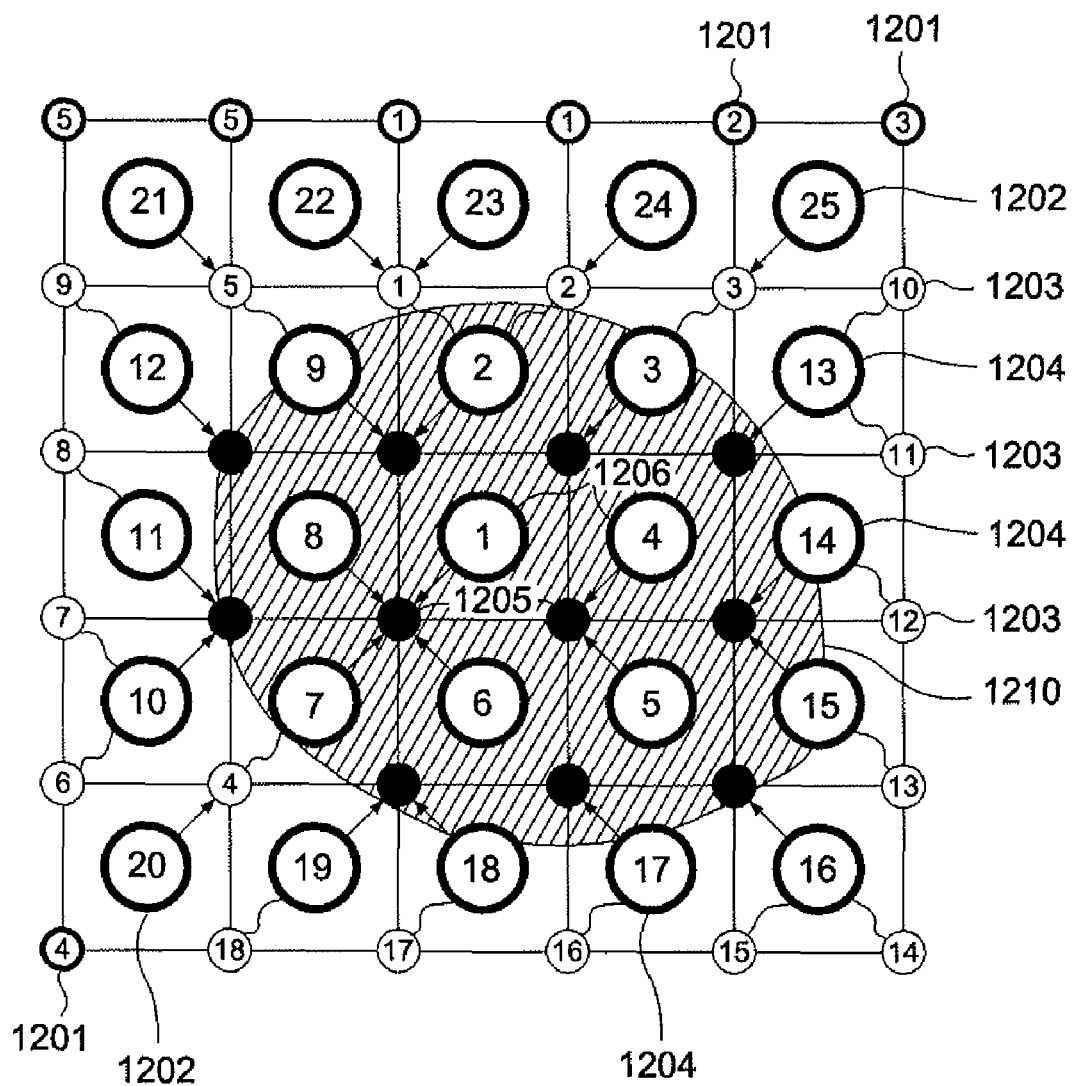
FIG. 12 shows the example two-dimensional LUT as shown in FIG. 6 after being populated using an exemplary embodiment of the present invention.

FIG. 12 shows the example LUT of FIG. 7 after the process of FIGS. 8a and 8b has been performed and populated all the nodes of the LUT. The nodes within constraint boundary 1210, such as nodes 1205, belonging to cells such as cells 1206, were populated with values of the sampled underlying process. The nodes, such as nodes 1203, belonging to a cell (such as one of cells 1204) which intersects constraint boundary 1210, but do not lie within the constraint boundary 1210 were populated using the NodeFittingRoutine. These nodes are numbered in the order in which they were populated. Furthermore, a wavy line associates these nodes with the cell in which they were fitted. Lastly, nodes such as nodes 1201 which belong to cells with no nodes lying within the constraint boundary 1210, such as cells 1202, were populated using the NodeCopyingRoutine. These nodes are numbered using the number of the fitted node of which they copied the value for population.

As a result, every node of the LUT is populated with a valid value, even those outside the constraint boundary. Therefore there is ordinarily no need to perform a run-time check for validity when using the LUT in a transformation. Furthermore, the end result LUT is superior to LUTs modeled using existing methods because each node of the end result LUT is populated with a valid value; however, the end result LUT has the same structure as the other modeled LUTs, and therefore the end result LUT is fully compatible with and can be used with existing technologies such as ICC profile format.

In addition, the nodes of the LUT with missing values are fitted using a minimal number of points, namely $2^N$. In other words, the linear system of equations described above is not overdetermined (i.e., it has the same number of unknowns as the number of equations). Furthermore, because the fitting procedure described-above is designed to be compatible with the interpolation algorithm used by the LUT, a populated LUT that more accurately models the underlying process results. For example, if a populated LUT having no missing nodes is resampled with an additional constraint boundary, and the above-described process for populating missing nodes is applied to form the new LUT, then the original LUT and the new LUT would produce the same result for points within the constraint boundary, when the same interpolation algorithm is used.

Figure 13:
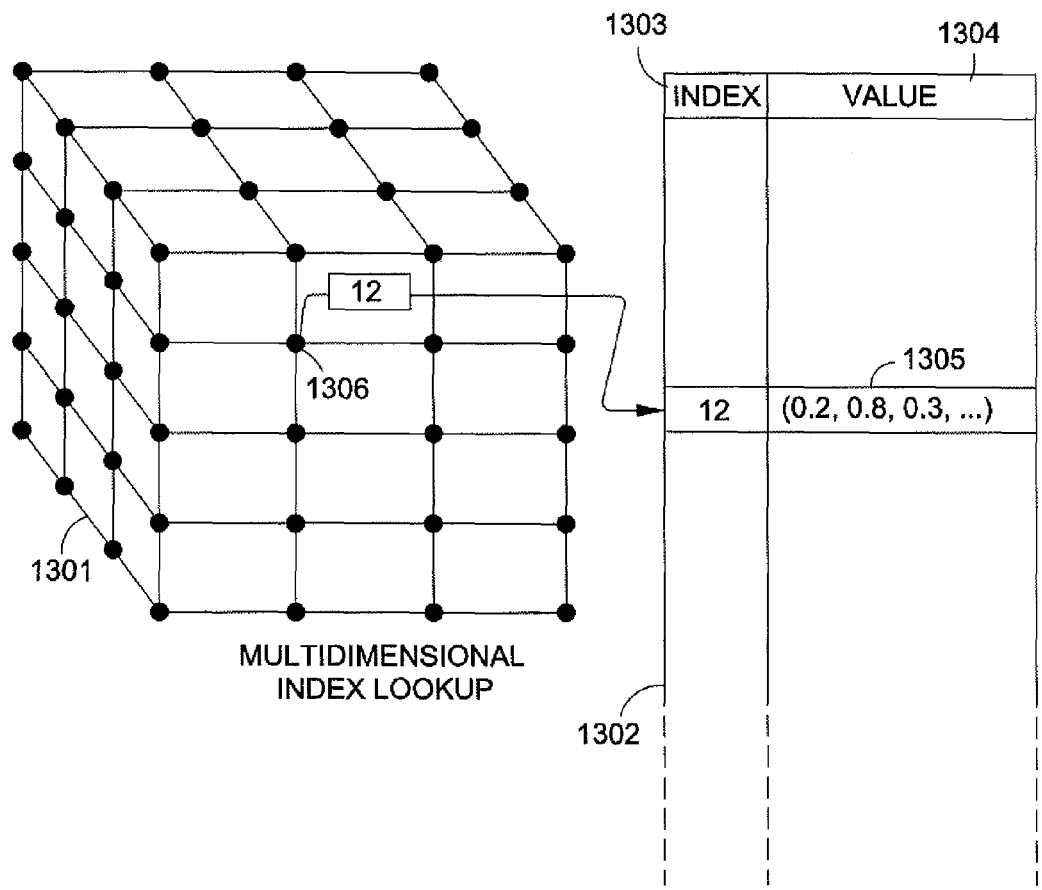
FIG. 13 is an illustration of an alternative embodiment for storing values of a populated LUT.

FIG. 13 is an illustration of an alternative embodiment for storing values of a populated LUT. As shown in FIG. 13, the alternative embodiment for storing the populated LUT values includes a multidimensional index look-up table 1301 and a one-dimensional linear array table 1302. The one-dimensional linear array table 1302 stores a value 1304 for each distinct value that is associated with a node contained in the multidimensional index look-up table 1301. The multidimensional index look-up table 1301 stores indices or addresses for each node (instead of actual output values), such as node 1306, associated with the index number of an entry in the one-dimensional linear array table 1302. The whole collection of distinct values associated with nodes inside the constraint boundary, fitted nodes and copied nodes, such as value 1305, are stored in the one-dimensional linear array table 1302. The order the nodes are stored in the one-dimensional linear array table 1302 is irrelevant as long as each distinct value has a unique index into the table; however, other considerations, such as minimizing cache misses by packing the nodes in each cell as closely as possible, may be taken into account.

Because of the NodeCopying Routine, a large number of duplicate values would result in the populated LUT. As a result, the saving of space, especially for high input dimension and/or high output dimension, would be significant by using the above storage method. For example, for a spectral device model of multi-ink printer, the number of missing nodes increases exponentially. In particular, ink limiting on a multi-ink printer results in a dramatic reduction in the number of ink combinations that can be printed, meaning that there would be many copied nodes. High output dimension means even more unnecessary space is needed for duplicating the value of a node instead of referencing the address of the value. Specifically, if an output requires r bytes of storage (e.g., in the spectral printer model example, 31 wavelength bands with each band coded in IEEE 32-bit single precision floating point numbers means r=31×4=124) and referencing a value by address requires s bytes of storage (e.g., a 32-bit memory address means s=4), the savings per node is r−s. This kind of LUT structure is not supported by ICC, but if compatibility with ICC is not a requirement, then the above-described LUT structure saves a large amount of space.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for populating values at nodes of a look-up table (LUT) which is arranged as a rectangular grid of cells, wherein the populated values model an underlying process that transforms from a first color space to a second color space, and wherein some of the cells of the LUT are completely inside a constraint boundary of the underlying process and some of the cells are not completely inside the constraint boundary, the method comprising:
- an indexing step of indexing the cells in an order which starts with a cell which is inside the constraint boundary and which is also farthest away from the constraint boundary, increases as the cells draw closer to the constraint boundary, and further increases as the cells cross and then fall outside the constraint boundary;
- an accessing step of accessing samples of the underlying process which lie on nodes of the grid within the constraint boundary, and accessing auxiliary samples of the underlying process which lie between nodes of the grid;
- a first populating step of populating values of nodes for cells whose nodes are all within the constraint boundary by using the samples of the underlying process; and
- a second populating step of populating values of nodes for cells whose nodes are not all within the constraint boundary by visiting such cells in the indexed order and populating values for the unpopulated nodes of such cells using populated ones of the nodes of such cells and the auxiliary samples of the underlying process.

2. The method according to claim 1, wherein an interpolation algorithm will be applied against the values at the nodes of the LUT when using the LUT to map from the first color space to the second color space, and wherein for cells having at least one node within the constraint boundary, said second populating step comprises:
- identifying an origin node of the cell, wherein the origin node is inside the constraint boundary and farthest from the constraint boundary;
- defining auxiliary points on the auxiliary samples of the underlying process for all unpopulated nodes in the cell such that each unpopulated node has a corresponding auxiliary sample, wherein the auxiliary points lie inside the constraint boundary between the origin node and the unpopulated nodes; and
- populating values of all unpopulated nodes by extrapolating using the populated node values and values of the auxiliary samples of the underlying process at the auxiliary points,
- wherein the extrapolation is an inverse of the interpolation algorithm.

3. The method according to claim 2, wherein the auxiliary point for an unpopulated node is defined as an intersection point of a path between the origin node and the unpopulated node and the constraint boundary.

4. The method according to claim 1, wherein for cells having no nodes within the constraint boundary, said second population step comprises:
- identifying an origin node of the cell, wherein the origin node is outside the constraint boundary and closest to the constraint boundary; and
- populating all unpopulated nodes of the cell by copying a value of the origin node to all the unpopulated nodes of the cell.

5. The method according to claim 1, further comprising:
- a confirming step of confirming whether granularity of the LUT is sufficiently fine, wherein the granularity of the LUT is sufficiently fine when each cell having a portion within the constraint boundary has at least one node that also lies within the constraint boundary.

6. The method according to claim 5, wherein if the granularity of the LUT is not sufficiently fine, the granularity is increased so that each cell having a portion within the constraint boundary has at least one node that also lies within the constraint boundary.

7. A method for storing values for nodes populated in the LUT of claim 1, wherein the method comprises:
- storing each distinct value of each of the populated nodes in a linear, one-dimensional LUT of distinct values; and
- storing in each node of a multidimensional LUT of indices the index address of a distinct value in the linear, one-dimensional LUT of distinct values,
- wherein for nodes in the LUT of claim 1 populated with repeated values corresponding with a distinct value in the linear, one-dimensional LUT of distinct values, the index address corresponding to the distinct value is stored in the multidimensional LUT of indices for such nodes.

8. A non-transitory computer-readable medium on which is stored a computer-executable program, the program being executable by a computer so as to control the computer to perform a method for populating values at nodes of a look-up table (LUT) which is arranged as a rectangular grid of cells, wherein the populated values model an underlying process that transforms from a first color space to a second color space, and wherein some of the cells of the LUT are completely inside a constraint boundary of the underlying process and some of the cells are not completely inside the constraint boundary, the method comprising:
- an indexing step of indexing the cells in an order which starts with a cell which is inside the constraint boundary and which is also farthest away from the constraint boundary, increases as the cells draw closer to the constraint boundary, and further increases as the cells cross and then fall outside the constraint boundary;
- an accessing step of accessing samples of the underlying process which lie on nodes of the grid within the constraint boundary, and accessing auxiliary samples of the underlying process which lie between nodes of the grid;
- a first populating step of populating values of nodes for cells whose nodes are all within the constraint boundary by using the samples of the underlying process; and
- a second populating step of populating values of nodes for cells whose nodes are not all within the constraint boundary by visiting such cells in the indexed order and populating values for the unpopulated nodes of such cells using populated ones of the nodes of such cells and the auxiliary samples of the underlying process.

9. The non-transitory computer-readable medium on which is stored a computer-executable program according to claim 8, wherein an interpolation algorithm will be applied against the values at the nodes of the LUT when using the LUT to map from the first color space to the second color space, and wherein for cells having at least one node within the constraint boundary, said second populating step comprises:
- identifying an origin node of the cell, wherein the origin node is inside the constraint boundary and farthest from the constraint boundary;
- defining auxiliary points on the auxiliary samples of the underlying process for all unpopulated nodes in the cell such that each unpopulated node has a corresponding auxiliary sample, wherein the auxiliary points lie inside the constraint boundary between the origin node and the unpopulated nodes; and
- populating values of all unpopulated nodes by extrapolating using the populated node values and values of the auxiliary samples of the underlying process at the auxiliary points,
- wherein the extrapolation is an inverse of the interpolation algorithm.

10. The non-transitory computer-readable medium on which is stored a computer-executable program according to claim 9, wherein the auxiliary point for an unpopulated node is defined as an intersection point of a path between the origin node and the unpopulated node and the constraint boundary.

11. The non-transitory computer-readable medium on which is stored a computer-executable program according to claim 8, wherein for cells having no nodes within the constraint boundary, said second population step comprises:
  identifying an origin node of the cell, wherein the origin node is outside the constraint boundary and closest to the constraint boundary; and
  populating all unpopulated nodes of the cell by copying a value of the origin node to all the unpopulated nodes of the cell.

12. The non-transitory computer-readable medium on which is stored a computer-executable program according to claim 8, further comprising:
  a confirming step of confirming whether granularity of the LUT is sufficiently fine, wherein the granularity of the LUT is sufficiently fine when each cell having a portion within the constraint boundary has at least one node that also lies within the constraint boundary.

13. The non-transitory computer-readable medium on which is stored a computer-executable program according to claim 12, wherein if the granularity of the LUT is not sufficiently fine, the granularity is increased so that each cell having a portion within the constraint boundary has at least one node that also lies within the constraint boundary.

14. A color management module for converting a color value in a source color space to a corresponding color value in a destination color space, comprising:
  an input unit constructed to receive a designation of the source color space, a designation of the destination color space, and a designation of a color transform from the source color space to the destination color space that is constrained to a region of the source color space;
  a construction unit which constructs a color look-up table (LUT) which maps color values in the source color space to corresponding color values in the destination color space by sampling the designated color transform; and
  an interpolation unit constructed to interpolate color values stored in nodes of cells of the LUT that are adjacent to a color value in the source color space, so as to provide the corresponding color value in the destination color space,
  wherein some of the cells of the LUT are completely inside a constraint boundary of the underlying color transform and some of the cells are not completely inside the constraint boundary, and
  wherein the color management module includes computer-executable program code stored on a computer-readable memory medium to populate nodes of cells in the LUT, wherein the program code controls the computer to perform a method according to any one of claims 1 to 7.

* * * * *